United States Patent [19]

Nagai et al.

[11] Patent Number: 4,539,129

[45] Date of Patent: Sep. 3, 1985

[54] BARIUM FERRITE PARTICLES AND PROCESS FOR PRODUCING SAID PARTICLES

[75] Inventors: Norimichi Nagai; Nanao Horiishi, both of Hiroshima; Masao Kiyama; Toshio Takada, both of Kyoto, all of Japan

[73] Assignee: Toda Kogyo Corp., Hiroshima, Japan

[21] Appl. No.: 525,642

[22] Filed: Aug. 23, 1983

[30] Foreign Application Priority Data

Aug. 31, 1982 [JP] Japan .................................. 57-152448

[51] Int. Cl.$^3$ ............................................... C04B 35/26
[52] U.S. Cl. .................................... 252/62.63; 423/594
[58] Field of Search ...................... 252/62.63; 423/594, 423/151; 365/33

[56] References Cited

U.S. PATENT DOCUMENTS

| | | | |
|---|---|---|---|
| 4,226,843 | 10/1980 | Wantanabe et al. | 252/62.63 |
| 4,341,648 | 7/1982 | Kubo et al. | 252/62.63 |
| 4,401,643 | 8/1983 | Hibst et al. | 423/594 |
| 4,425,250 | 1/1984 | Hibst | 252/62.63 |

FOREIGN PATENT DOCUMENTS

| | | | |
|---|---|---|---|
| 0039773 | 11/1981 | European Pat. Off. | 252/62.63 |
| 0198607 | 12/1982 | Japan | 423/594 |

Primary Examiner—Melvyn J. Andrews
Assistant Examiner—Robert L. McDowell
Attorney, Agent, or Firm—Lyon & Lyon

[57] ABSTRACT

Barium ferrite particles of a coercive force of not more than 1,000 Oe suitable for use as a magnetic material for magnetic recording and a process for producing said particles are disclosed herein.

13 Claims, 5 Drawing Figures

(x 10000)

(x 10000)

BARIUM FERRITE PARTICLES AND PROCESS FOR PRODUCING SAID PARTICLES

BACKGROUND AND SUMMARY OF THE INVENTION

The present invention relates to barium ferrite particles of magnetic properties, especially not more than 1,000 Oe of a coercive force suitable for use as a magnetic material for magnetic recording. And the present invention relates to a process for producing the barium ferrite particles.

Hitherto, the barium ferrite particles have been obtained by igniting a mixture of iron(III) oxide and barium carbonate at high temperature in the air, and the thus-produced particles have more than 3,000 Oe of the coercive force. Therefore, such a barium ferrite particles are not suitable for use as the magnetic material for magnetic recording and in fact they are widely used as a permanent magnet.

Another method for producing the barium ferrite particles comprises subjecting an alkaline suspension containing ferric ions and barium ions to autoclaving. In this method, a ferromagnetic precipitate, barium ferrite, consisting of hexagonal plate-like particles, can be obtained and at the same time nonferromagnetic precipitates, $\alpha$-Fe$_2$O$_3$, are also formed depending on the reaction conditions. In addition, the magnetic properties of the ferromagnetic particles obtained also widely vary since a variety of the particles in particle size are produced depending on the reaction conditions. Therefore, the barium ferrite particles having the magnetic properties suitable for use as the magnetic material for magnetic recording can be hardly obtained by this method.

An object of the present invention is to improve the latter method so as to obtain the barium ferrite particles having the magnetic properties suitable for use as the magnetic material for magnetic recording.

This and other objects of the present invention will be apparent from the following descriptions.

The foregoing and other objects of the present invention will be accomplished by the process of the present invention, wherein the prior art is improved based on the finding that a specific surface area of the barium ferrite particles should be not more than 5 m$^2$/g to obtain the particles having the coercive force of not more than 1,000 Oe.

The terminology used herein is defined as follows:

"Specific surface area" is intended to refer to the value measured by the BET method.

"Coercive force" is intended to refer to the value measured at a degree of packing density of 1.6 g/cm$^3$.

"Maximum magnetization" is intended to refer to the value measured by the VSM method at the magnetic field of 10 kOe.

"Apparent density" and "tap density" are intended to refer to the values measured following JIS K 5101.

BRIEF EXPLANATION OF THE DRAWINGS

FIG. 3 shows the hexagonal, plate-like barium ferrite particles obtained in Example 1 and FIG. 4 shows the hexagonal, plate-like barium ferrite particles obtained in Example 2.

DETAILED EXPLANATION OF THE INVENTION

Based on the experimental results obtained by the inventors of the present invention, the effects of the specific surface area to the magnetic properties of the barium ferrite particles will be described as follows while referring to the attached drawings.

The barium ferrite particles with different specific surface area were produced by changing the reaction conditions, such as temperature, kinds and concentrations of the starting materials, etc., which were used in the experiment. Then, the magnetic properties of the particles obtained were measured and the results were as shown in FIGS. 1 and 2.

Figure 1:
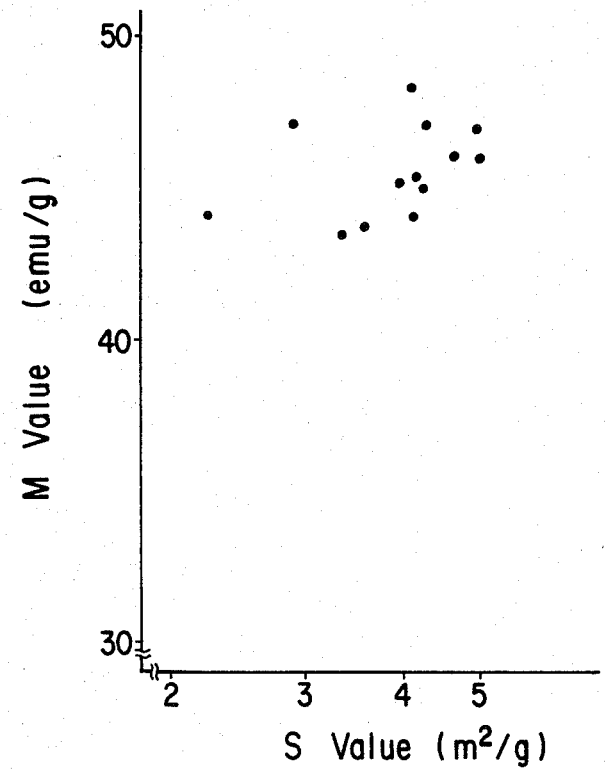
FIG. 1 shows a relation between the maximum magnetization (M) value of the barium ferrite particles and the specific surface area (S) value thereof.
Figure 2:
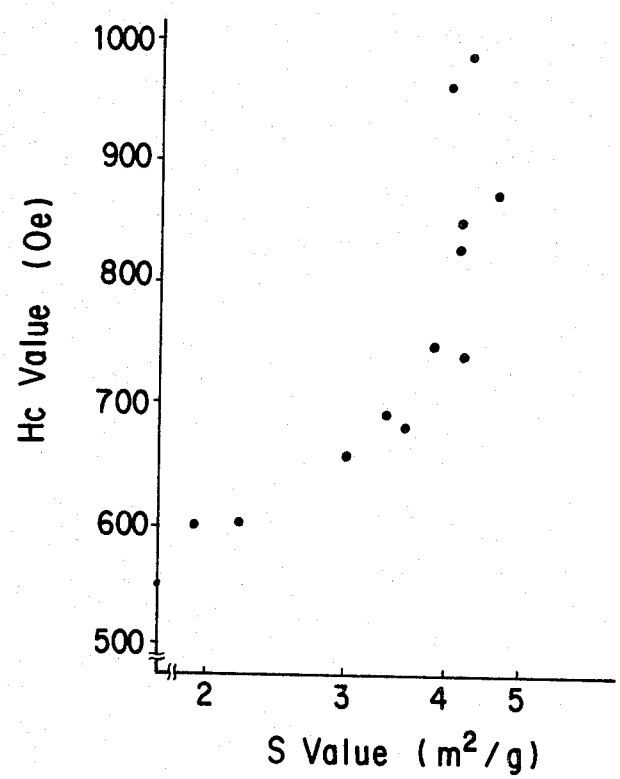
FIG. 2 shows a relation between the coercive force (Hc) value of the barium ferrite particles and the specific surface area (S) value thereof.

FIG. 1 shows a relation between the maximum magnetization of the barium ferrite particles and the specific surface area thereof and FIG. 2 shows a relation between the coercive force and the specific surface area.

As shown in FIGS. 1 and 2, there is a tendency of a lowering of the coercive force of the particles with the decrease of the specific surface area, although the maximum magnetization thereof is little affected by the specific surface area. And it is clear from FIG. 2 that the specific surface area of the barium ferrite particles should be at most 5 m$^2$/g to obtain the particles of not more than 1,000 Oe of the coercive force.

While, the prior art wherein the alkaline suspension containing the ferric ions and the barium ions is subjected to autoclaving did not make the specific surface area to be smaller than 11 m$^2$/g.

According to the present invention, wherein the acicular particles of $\alpha$-FeO(OH) with the specific surface area of 10 to 25 m$^2$/g are used as the ferric ions, the barium ferrite particles produced have the specific surface area of 0.5 to 5.0 m$^2$/g and so the coercive force thereof is not more than 1,000 Oe, which is suitable for use as the magnetic material for magnetic recording. And the maximum magnetization of the barium ferrite particles of the present invention is 35 to 60 emu/g.

The barium ferrite particles with the specific surface area of less than 0.5 m$^2$/g have the suitable coercive force, but they are not preferable since the particle size thereof is large. And the barium ferrite particles with the specific surface area of more than 5.0 m$^2$/g are not preferable due to their unsuitable coercive force.

If the barium ferrite particles having the coercive force of 600 to 800 Oe are desired, the specific surface area thereof is preferably 2 to 4 m$^2$/g and the maximum magnetization thereof is preferably 42 to 47 emu/g.

Now the conditions for carrying out the process of the present invention will be explained in detail as follows.

The barium ferrite particles in a form of plate-like having the specific surface area of 0.5 to 5.0 m$^2$/g of the present invention can be produced by subjecting the alkaline suspension containing the acicular particles of $\alpha$-FeO(OH) with the specific surface area of 10 to 25 m$^2$/g and barium ions to autoclaving at a temperature of 250° to 360° C.

The acicular particles of α-FeO(OH) used as the starting material have the specific surface area of 10 to 25 m²/g, preferably 15 to 18 m²/g. To obtain the barium ferrite particles of the coercive force of 600 to 800 Oe, it is desirable that the acicular particles of α-FeO(OH) with the specific surface area of 15 to 18 m²/g are used. Further, considering the dispersibility of the acicular particles in the suspension, they have preferably an apparent density of not more than 0.08 g/cm³ and/or a tap density of not more than 0.2 g/cm³. When the acicular particles of α-FeO(OH) with the specific surface area out of the above-mentioned range are used, the barium ferrite particles with the desired specific surface area cannot be naturally produced.

It is necessary that the acicular particles of α-FeO(OH) are present in the suspension in an amount of at least 6 times based on the amount of the barium ions and calculated as the atomic ratio of Fe(III) to Ba. Generally, the acicular particles of α-FeO(OH) are present in the suspension in an amount of 6 to 8 times based on the amount of the barium ions and calculated as the atomic ratio of Fe(III) to Ba.

The pH of the alkaline suspension is over 11, preferably 13 to 14. When the pH of the suspension is not more than 11, the reaction system is unsuitable to obtain the desired particles.

The reaction temperature is 250° to 360° C., preferably 280° to 320° C. When the reaction temperature is not more than 250° C., the incomplete reaction is caused and thereby the desired particles can be difficultly produced. On the other hand, the temperature of more than 360° C. is above the critical temperature and it is not favorable.

Now the advantages of the present invention will be summarized as follows.

According to the present invention, the barium ferrite particles with the specified specific surface area are easily and constantly produced, and the thus-produced barium ferrite particles have not more than 1,000 Oe of the coercive force while maintaining high maximum magnetization. Accordingly, the barium ferrite particles of the present invention are favorably suitable as the magnetic material for magnetic recording. They are particularly suitable as the magnetic material for perpendicular magnetic recording since the c axis thereof is the easy direction of magnetization.

Now the present invention will be described by the examples.

EXAMPLE 1

An alkaline suspension was prepared in an autoclave by mixing 25.6 g (0.640 mol) of acicular particles of α-FeO(OH) with specific surface area of 16.7 m²/g, apparent density of 0.07 g/cm³ and tap density of 0.20 g/cm³, 25.2 g (0.08 mol) of barium hydroxide octahydrate and 42.0 g (1.05 mol) of sodium hydroxide in 700 ml of decarbonated water. The alkaline suspension was heated to 320° C. under a pressure of 110 kg/cm², and kept at this temperature for 5 hours.

After cooling the suspension to room temperature, the precipitate was separated by filtration, washed thoroughly with water and dried at 80° C. to obtain the hexagonal, plate-like ferromagnetic brown particles.

Figure 3:
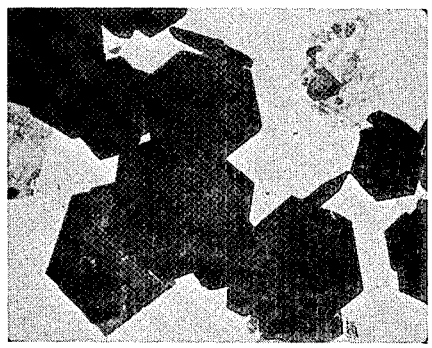
FIGS. 3 and 4 show electron microscope photographs taken at a magnification of 10000 times.

The properties of the particles thus obtained were as follows and the electron microscope photograph thereof taken at a magnification of 10000 times was shown in FIG. 3.

Specific surface area: 2.2 m²/g
Coercive force: 603 Oe
Maximum magnetization: 45 emu/g

EXAMPLE 2

An alkaline suspension was prepared in an autoclave by mixing 0.647 mol of acicular particles of α-FeO(OH) with the specific surface area of 15.9 m²/g, apparent density of 0.08 g/cm³ and tap density of 0.20 g/cm³, 0.08 mol of barium hydroxide octahydrate and 1.05 mol of sodium hydroxide in 700 ml of decarbonated water. The alkaline suspension was heated to 300° C. under a pressure of 80 kg/cm², and then stirred at 600 r.p.m. for 3 hours.

After cooling the suspension to room temperature, the precipitate was separated by filtration, washed thoroughly with water and dried at 80° C. to obtain the hexagonal, plate-like ferromagnetic brown particles.

Figure 4:
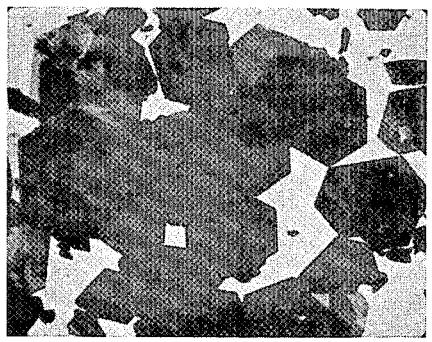

The properties of the particles thus obtained were as follows and the electron microscope photograph thereof taken at the magnification of 10000 times was shown in FIG. 4.

Figure 5:
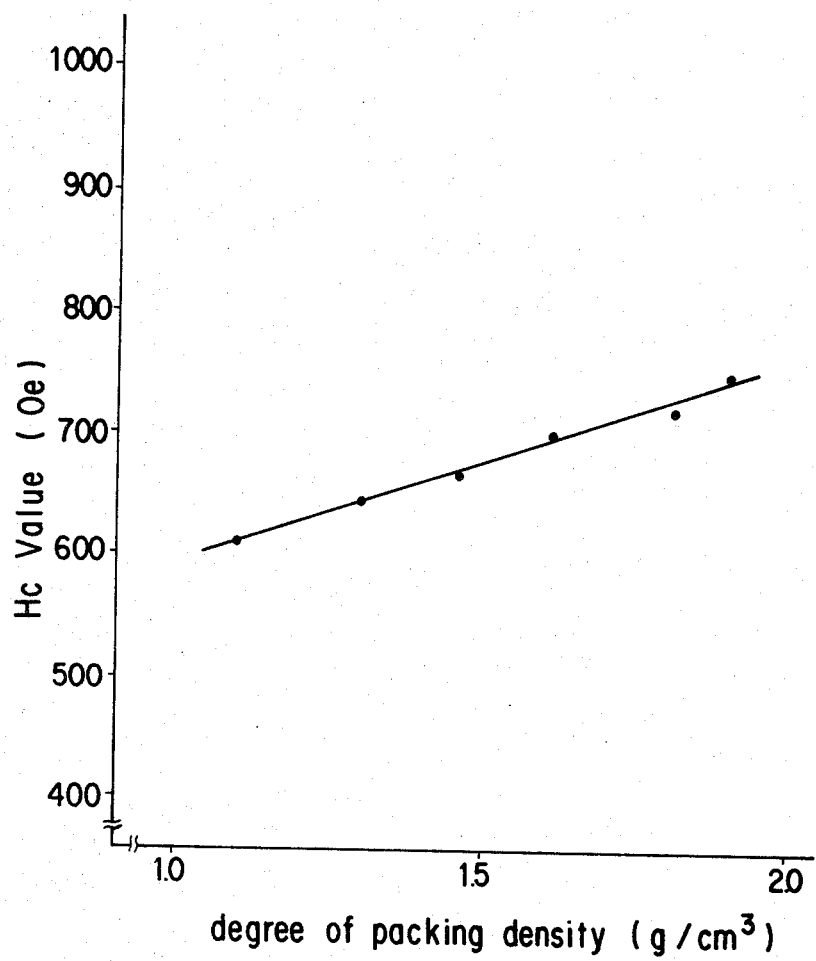
FIG. 5 shows a relation between the coercive force (Hc) value of the barium ferrite particles obtained in Example 2 and the degree of packing density.

Specific surface area: 3.35 m²/g
Coercive force: 691 Oe
Maximum magnetization: 44 emu/g As mentioned above, the coercive force of the barium ferrite particles was measured at the degree of packing density of 1.6 g/cm³. However, the c axis of the barium ferrite particles is the easy direction of magnification and therefore the coercive force largely depends on the degree of packing density as shown in FIG. 5. Accordingly, the magnetic tape having the desired coercive force can be obtained by suitably adjusting the degree of packing density on producing the magnetic tape, in particular the perpendicular magnetic recording tape even if the barium ferrite particles used as the magnetic material have relatively small coercive force.

What is claimed is:

1. Barium ferrite particles in a form of plate-like having a specific surface area of 0.5 to 5.0 m²/g, a maximum magnetization of 35 to 60 emu/g and a coercive force of not more than 1,000 Oe.

2. The particles of claim 1, wherein their specific surface area is 2 to 4 m²/g.

3. The particles of claim 1, wherein their maximum magnetization is 42 to 47 emu/g.

4. The particles of claim 1, wherein their coercive force is 600 to 800 Oe.

5. The particles of claim 1, wherein they are in a form of hexagonal plate-like.

6. A process for producing barium ferrite particles in a form of plate-like, comprising subjecting an alkaline suspension containing acicular particles of α-FeO(OH) with a specific surface area of 10 to 25 m²/g and barium ions to autoclaving at a temperature of 250° to 360° C.

7. The process of claim 6, wherein the acicular particles of α-FeO(OH) have the specific surface area of 15 to 18 m²/g.

8. The process of claim 6, wherein the acicular particles of α-FeO(OH) have an apparent density of not more than 0.08 g/cm³.

9. The process of claim 6, wherein the acicular particles f α-FeO(OH) have a tap density of not more than 0.2 g/cm³.

10. The process of claim 6, wherein the acicular particles of α-FeO(OH) have the apparent density of not more than 0.08 g/cm³ and the tap density of not more than 0.2 g/cm³.

11. The process of claim 6, wherein the temperature is 280° to 320° C.

12. The process of claim 6, wherein the acicular particles of α-FeO(OH) are present in the suspension in an amount of at least 6 times based on the amount of the barium ions and calculated as the atomic ratio of Fe(III) to Ba.

13. The process of claim 12, wherein the acicular particles of α-FeO(OH) are present in the suspension in an amount of 6 to 8 times based on the amount of the barium ions and calculated as the atomic ratio of Fe(III) to Ba.

* * * * *